(12) United States Patent
Alonzo et al.

(10) Patent No.: US 11,760,004 B2
(45) Date of Patent: Sep. 19, 2023

(54) HIGH CAPACITY THREE-DIMENSIONAL PRINTER WITH DRAIN SYSTEM FOR HEAVY ARTICLES

(71) Applicant: 3D Systems, Inc., Rock Hill, SC (US)

(72) Inventors: Daniel Alonzo, San Diego, CA (US); David Sabo, San Diego, CA (US); Michael W. Munro, San Diego, CA (US)

(73) Assignee: 3D SYSTEMS. INC.

( * ) Notice: Subject to any disclaimer, the term of this patent is extended or adjusted under 35 U.S.C. 154(b) by 0 days.

(21) Appl. No.: 17/734,318

(22) Filed: May 2, 2022

(65) Prior Publication Data
US 2022/0258409 A1 Aug. 18, 2022

Related U.S. Application Data

(60) Provisional application No. 62/185,712, filed on Jun. 28, 2015.

(51) Int. Cl.
*B29C 64/124* (2017.01)
*B29C 64/232* (2017.01)
(Continued)

(52) U.S. Cl.
CPC .......... *B29C 64/124* (2017.08); *B29C 64/232* (2017.08); *B29C 64/245* (2017.08);
(Continued)

(58) Field of Classification Search
CPC ... B29C 64/124; B29C 64/232; B29C 64/245; B29C 64/35; B29C 64/357; B29C 64/379; B33Y 10/00; B33Y 30/00; B33Y 40/00
See application file for complete search history.

(56) References Cited

U.S. PATENT DOCUMENTS

2017/8217100    8/2017  Gardiner
2020/0391438 A1* 12/2020 Costabeber ........... B29C 64/259

FOREIGN PATENT DOCUMENTS

EP    1769901 A2    4/2007
EP    3402652 A1    11/2018

OTHER PUBLICATIONS

PCT International Search Report for PCT Application No. PCT/US2022/027241, dated Jul. 26, 2022 (7 pages).
(Continued)

*Primary Examiner* — Joseph S Del Sole
*Assistant Examiner* — Baileigh Kate Darnell

(57) ABSTRACT

A three-dimensional (3D) printing system for manufacturing a 3D article includes a resin vessel, a build plate, a plate support, a hook subsystem, an elevator subsystem, an imaging subsystem, and a controller. The build plate has an upper surface and extends from a proximal end to a distal end. The hook subsystem includes a hook. The controller is configured to: (a) Operate the elevator subsystem and the imaging subsystem to fabricate the 3D article. (b) Operate the elevator subsystem to raise the 3D article above photocurable resin in the resin vessel. (c) Operate the hook subsystem to configure the hook to be engaged with the proximal end of the build plate. (d) Operate the elevator subsystem to impart a vertical separation distance between the proximal and distal ends of the build plate. The vertical separation distance defines an angular tilt of the 3D article to facilitate draining of residual photocurable.

17 Claims, 13 Drawing Sheets

(51) Int. Cl.
    *B29C 64/245*     (2017.01)
    *B29C 64/35*     (2017.01)
    *B33Y 40/00*     (2020.01)
    *B33Y 10/00*     (2015.01)
    *B33Y 30/00*     (2015.01)

(52) U.S. Cl.
    CPC .............. *B29C 64/35* (2017.08); *B33Y 10/00* (2014.12); *B33Y 30/00* (2014.12); *B33Y 40/00* (2014.12)

(56) References Cited

OTHER PUBLICATIONS

PCT Written Opinion for PCT Application No. PCT/US2022/027241, dated Jul. 26, 2022 (7 pages).

\* cited by examiner

HIGH CAPACITY THREE-DIMENSIONAL PRINTER WITH DRAIN SYSTEM FOR HEAVY ARTICLES

CROSS-REFERENCE TO RELATED APPLICATIONS

This non-provisional patent application claims priority to U.S. Provisional Application Ser. No. 63/185,712, Entitled "High Capacity Three-Dimensional Printer with Drain System for Heavy Articles" by Daniel Alonzo et al., filed on May 7, 2021, incorporated herein by reference under the benefit of U.S.C. 119(e).

FIELD OF THE INVENTION

The present disclosure concerns an apparatus and method for the digital fabrication of three-dimensional (3D) articles by a layer-by-layer solidification of a build material. More particularly, the present disclosure concerns a mechanical system configured to facilitate draining of residual photocurable resin from large and heavy 3D articles.

BACKGROUND 3D printing systems are in wide use for prototyping and manufacturing articles. One type of 3D printing system utilizes a process called stereolithography. A typical stereolithography system utilizes a resin vessel, an imaging system, and a build plate within liquid resin held by the resin vessel. A three-dimensional (3D) article is manufactured in a layer-by-layer manner by selectively imaging and solidifying layers of the resin over the build plate. One challenge is the manufacture of very large objects. When a 3D article is fabricated and lifted out of the resin vessel, it tends to be covered with uncured photocurable resin. There is a desire to pour as much of this uncured resin back into the resin vessel as possible to avoid waste of expensive material and to reduce cleaning requirements. For large and heavy articles, this can be difficult and present safety issues.

SUMMARY

Figure 1:
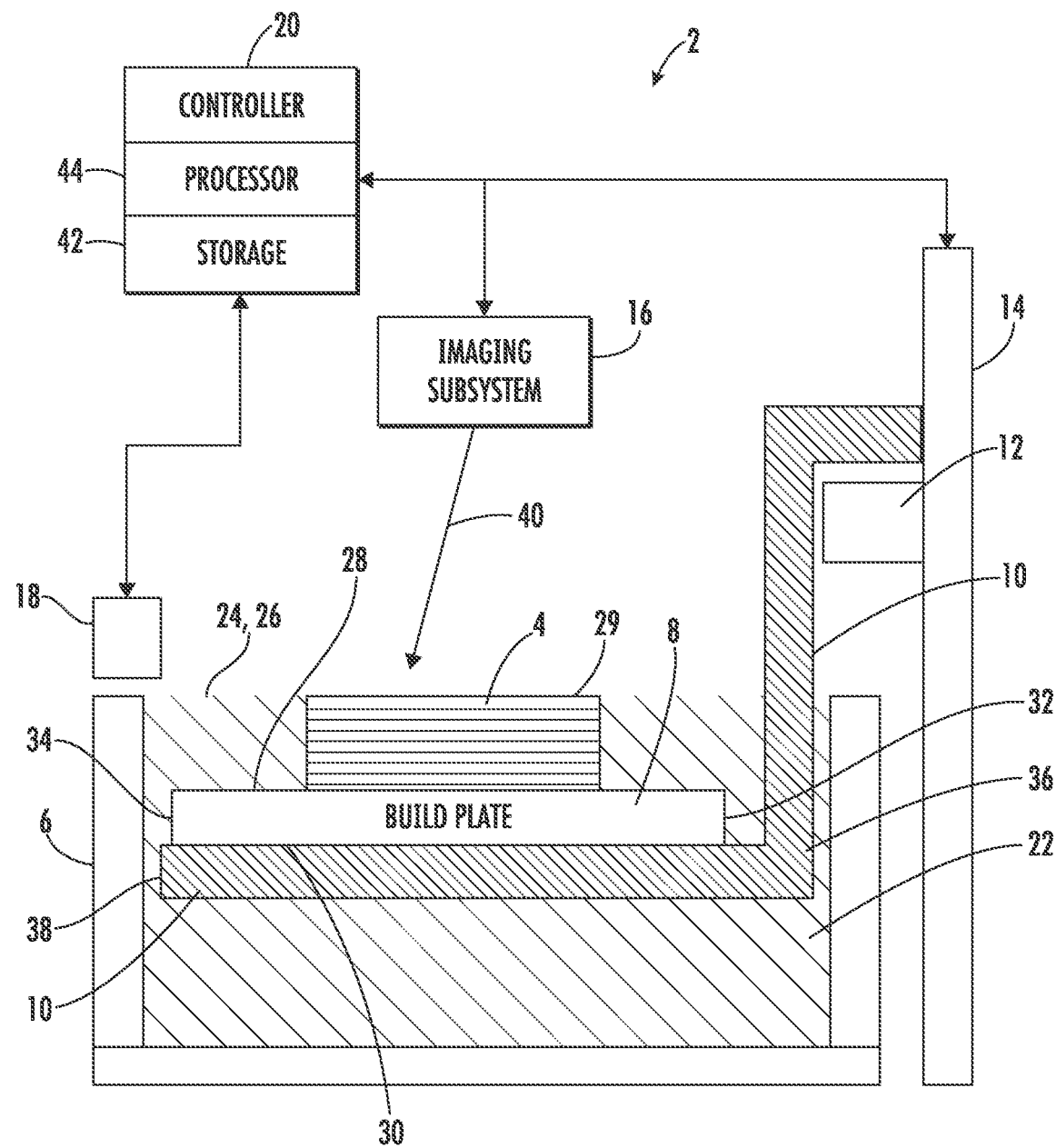
FIG. 1 is a schematic representation of an embodiment of a three-dimensional (3D) printing system for manufacturing a 3D article.

In an aspect of the disclosure, a three-dimensional (3D) printing system is configured to manufacture a 3D article. The 3D printing system includes a resin vessel, a build plate, a plate support, a hook subsystem, an elevator subsystem, an imaging subsystem, and a controller. The resin vessel is configured for containing a liquid photocurable resin. The build plate has an upper surface and an opposed lower side. The build plate extends along a Y-axis from a proximal end or edge to a distal end or edge. The plate support supports the build plate. The plate support extends along the Y-axis from a proximal end to a distal end. The proximal and distal ends of the build plate correspond to and overlay the proximal and distal ends of the plate support respectively. The hook subsystem includes a hook. The controller is configured to: (a) Operate the elevator subsystem and the imaging subsystem to progressively lower the upper surface of the build plate into the photocurable resin within the resin vessel while forming the 3D article onto the upper surface of the build plate. (b) Operate the elevator subsystem to raise the 3D article to a vertical position above a level of photocurable resin in the resin vessel. (c) Operate the hook subsystem to configure the hook to be engaged with the proximal end of the build plate. (d) Operate the elevator subsystem to impart a vertical separation distance between the proximal end of the build plate supported by the hook subsystem and the distal end of the build plate supported by the plate support. The vertical separation distance defines an angular tilt of the build plate and the 3D article to facilitate draining of residual photocurable resin from the 3D article into the resin vessel. The hook can include two hooks that are spatially separated to engage the proximal end of the build plate at spaced part locations.

In one implementation, the 3D article weighs more than 100 pounds, more than 150 pounds, or more than 200 pounds. Prior systems required manual processes to tilt and drain 3D articles. For very large and heavy articles, this is impractical and potentially dangerous to a user of a 3D printing system. The angular tilt is at least 10 degrees, at least 20 degrees, at least 20 degrees, at least 30 degrees, or more. The angular tilt can depend upon a geometry and/or weight of a 3D article.

In another implementation, the hook subsystem includes a four bar linkage and an actuator. The four bar linkage includes a hook rotating link coupled to the hook. The actuator is configured to press upon the hook rotating link which in turn rotates the hook from a non-engagement configuration to the engagement configuration.

In yet another configuration, the hook subsystem includes one or more linear and/or rotating actuators coupled to the hook. Actuation of the one or more linear and/or rotating actuators moves the hook from the non-engagement configuration to the engagement configuration.

In a further implementation, the build plate has a lower side with a downwardly extending lip adjacent to a recess. The recess extends upward into the lower side of the build plate. Operating the hook subsystem includes positioning a tip of the hook below the recess. The hook is configured to engage the downwardly extending lip to maintain a vertical position of the proximal end of the build plate relative to the distal end of the build plate during step (d).

In a yet further implementation, the controller is further configured to operate the elevator subsystem to reduce the vertical separation distance until the build plate upper surface is generally horizontal. The hook can be configured to engage an edge of the build plate to push the proximal end of the build plate along the plate support. The distal end of the plate support can include a cam surface. The distal end of the build plate follows the cam surface as the vertical separation distance is varied by the elevator subsystem. In an illustrative embodiment, the cam surface can include a ramp surface that slopes downwardly with a slope of less than 30 degrees from the distal end to the proximal end. The ramp surface facilitates raising the distal end of the build plate over a datum without excessive force. The slope can be more than 30 degrees, but a lower number reduces a sliding force requirement.

In another implementation, the plate support can include a plurality of upward extending datums configured to engage a lower side of the build plate when the build plate is generally horizontal. The plurality of upward extending datums can include two distal datums spaced apart with respect to an X-axis that is orthogonal to the Y-axis and positioned to engage the lower side of the distal end of the build plate. The plate support can include a pair of cam surfaces that are spaced apart with respect to the X-axis. The distal end of the build plate follows the cam surface along the Y-axis as the vertical separation distance is varied. The cam surface lifts the distal end of the build plate off of the distal datums as the vertical separation distance is increased. The cam surface can include a flat surface that overlays the proximal datums with respect to the Y-axis, the flat surface maintains a spacing of the distal end of build plate above the datums as the distal end of the build plate follows the flat surface; a first ramp that slopes upwardly from the distal end of the plate support to the flat surface; and a second ramp that slopes downwardly away from the flat surface toward the proximal end of the plate support.

In a second aspect of the disclosure, a method for manufacturing a 3D article utilizes a 3D printing system. The 3D printing system includes a resin vessel, a build plate, a plate support, a hook subsystem, an elevator subsystem, and an imaging subsystem. The resin vessel is configured for containing a liquid photocurable resin. The build plate has an upper surface and an opposed lower side. The build plate extends along a Y-axis from a proximal end or edge to a distal end or edge. The plate support supports the build plate. The plate support extends along the Y-axis from a proximal end to a distal end. The proximal and distal ends of the build plate correspond to and overlay the proximal and distal ends of the plate support respectively. The hook subsystem includes a hook. The method includes: (a) Operating the elevator subsystem and the imaging subsystem to progressively lower the upper surface of the build plate into the resin vessel while forming the 3D article onto the upper surface of the build plate, (b) Operating the elevator subsystem to raise the 3D article to a vertical position above a level of photocurable resin in the resin vessel. (c) Operating the hook subsystem to move the hook from a non-engagement configuration to an engagement configuration, in the engagement configuration the hook is positioned for engagement with the proximal end of the build plate. (d) Operating the elevator subsystem to impart a vertical separation distance between the proximal end of the build plate supported by the hook subsystem and the distal end of the build plate supported by the plate support. The vertical separation distance defines an angular tilt of the build plate and the 3D article to facilitate draining of residual photocurable resin from the 3D article into the resin vessel. The hook can include two hooks that are spatially separated to engage the proximal end of the build plate at spaced part locations.

The apparatus and method of the present disclosure facilitates removal of uncured resin from large and heavy objects formed by stereolithography. Uncured resin is very expensive and can be a health hazard for an operator of a stereolithographic 3D printing system. For smaller objects, the operator can manually unload and drain resin from a 3D article. But for large and heavy objects this may not be practical. The apparatus and method of the present disclosure enables a mechanized method of draining resin to avoid operator injury and to minimize potential operator exposure to residual resin on large and heavy 3D articles.

DETAILED DESCRIPTION OF THE PREFERRED EMBODIMENTS

FIG. 1 is a schematic representation of an embodiment of a three-dimensional (3D) printing system 2 configured for manufacturing a 3D article 4. In describing system 2, mutually orthogonal axes X, Y, and Z will be utilized and otherwise referred to as an X-axis, a Y-axis, and a Z-axis. Axes X and Y are lateral axes that are generally horizontal. Axis Z is a vertical axis that is generally aligned with a gravitational reference. The term "generally" implies that a direction or magnitude is not necessarily exact but is by design. Terms such as horizontal, vertical, perpendicular, or aligned are generally by engineering design and intent and are accurate to within manufacturing tolerances.

Manufacturing tolerances may be affected factors such as the type of material being used in constructing a component of a system. Manufacturing tolerances may also be affected by a particular process sequence used in fabricating and assembling parts of a system.

3D printing system 2 includes a resin vessel 6, a build plate 8, a plate support 10, a hook subsystem 12, an elevator subsystem 14, an imaging subsystem 16, a coater 18, and a controller 20. Controller 20 is electrically and/or controllably coupled to the hook subsystem 12, elevator subsystem 14, imaging subsystem 16, and coater 18.

The resin vessel 6, otherwise known as a vat 6, is configured to contain a large volume of photocurable resin 22. The photocurable resin 22 is a liquid polymer resin that includes, inter alia, one or more monomers and one or more catalysts. The photocurable resin 22 is configured to polymerize and harden from a liquid state to a solid state during a radiation cure process. The radiation cure process includes radiative exposure of the photocurable resin to blue, violet, and/or ultraviolet radiation. The radiation cure process can utilize radiation having one or more spectral peaks that are preferably optimized for the catalysts. The photocurable resin 22 has an upper surface 24 which is proximate to a build plane 26 when a layer of the photocurable resin 22 is cured over the build plate 8.

The build plate 8 has an upper surface 28 and an opposed lower side 30. The build plate 8 extends along the Y-axis from a proximal end 32 to a distal end 34. The proximal end 32 defines an edge of the build plate 8 that is closest to the elevator subsystem 14. The plate support 10 extends from a proximal end 36 to a distal end 38. The proximal 36 and distal 38 ends of the plate support 10 correspond to and are overlaid by the proximal 32 and distal 34 ends of the build plate 8 respectively. The hook subsystem 12 will be discussed infra.

The elevator subsystem 14 is configured to raise and lower the plate support 10 with respect to the vertical Z-axis. The elevator subsystem 14 is also configured to control a vertical separation distance between the plate support 10 and the hook subsystem 12. In some embodiments, the hook subsystem 12 remains vertically stationary and the vertical separation distance is modulated by raising and lowering the plate support 10. In other embodiments, the elevator subsystem can vertically translate both the plate support 10 and the hook subsystem 12.

In a first embodiment, the elevator subsystem 14 translates the plate support 10 using a motor driven cable and pulley system. In such an embodiment, the motor is stationary and turns a gear that engages a portion of the cable. The cable is stretched over two pulleys. The plate support 10 (and/or hook subsystem 12) is attached to the cable. As the motor turns the gear, this has the effect of moving the cable over the pulleys, thus translating the plate support 10 (and/or hook subsystem 12) up and down.

In a second embodiment, the elevator subsystem 14 includes a motorized lead screw that is threaded into a threaded bearing. The threaded bearing is attached to the plate support 10. A motor fixed in location turns the lead screw and in doing so translates the plate support 10 up and down. The first and second embodiments are just two examples of how an elevator subsystem can translate the plate support 10 (and possibly the hook support 12 independently). Other means of vertical translation are known in the art for 3D printers and stereolithography.

The imaging subsystem 16 is configured to impart radiation to the build plane 26 to selectively cure a layer of the photocurable resin 22 over build plane 26. In one embodiment, the imaging subsystem 16 includes a laser reflected in sequence by two galvanometer mirrors so as to scan a laser beam 40 over the build plane along the X and Y axes. In another embodiment, the imaging subsystem 16 can employ an array of light emitting diodes or lasers that are scanned over the build plane 26. Yet other imaging subsystems can employ light sources and light modulators. The light sources can emit blue, violet, and/or ultraviolet radiation for selectively curing layers of the photocurable resin 22. Various types of imaging subsystems 16 are known in the art for stereolithography systems.

The coater 18 can include a motorized wiper module. In one embodiment, the wiper module is a rectangular block with a wiper blade that extends downward to build plane 26 and along the X-axis. The wiper module is constrained to translate along the Y-axis and can be moved up and down along the Z-axis by a motor or solenoid valve. A belt and pully system translates the wiper module along the Y-axis. The belt is tensioned between two pulleys, one of which is coupled to a motor under control of controller 20. The wiper module is coupled to a portion of the tensioned belt. As the motor rotates a pully, the effect is to translate the wiper module along the Y-axis. Other mechanisms for moving the wiper module are possible, such as a motorized lead screw received into a threaded bearing carried by the wiper module. Various wiper modules are well known in 3D printing including stereolithography.

The controller 20 includes a non-transient or non-volatile information storage device 42 coupled to a processor 44. The information storage device 42 stores software instructions. Execution of the software instructions by the processor 44 causes the controller 20 to operate components of the 3D printing system 2. In this way, the controller 20 is configured to fabricate the 3D article by the following steps: (1) operate the elevator subsystem 14 to position an upper surface 29 of the 3D article 4 (initially onto upper surface 28 of build plate 8) proximate to build plane 26, (2) operate coater 18 (which can include a wiper module which in turn includes a motorized translatable wiper blade) to define a layer thickness of photocurable resin 22 over the upper surface 29, (3) operate the imaging subsystem 16 to selectively cure and harden a layer of the photocurable resin 22 over the upper surface 29, and repeat (1)-(3) to complete a layer-by-layer fabrication of 3D article 4. In some embodiments, the operation includes forming base layers under the 3D article and a scaffold for supporting the 3D article. In referring to the 3D article 4, the scaffold and base layers may be included or excluded in the current disclosure.

Figure 2:
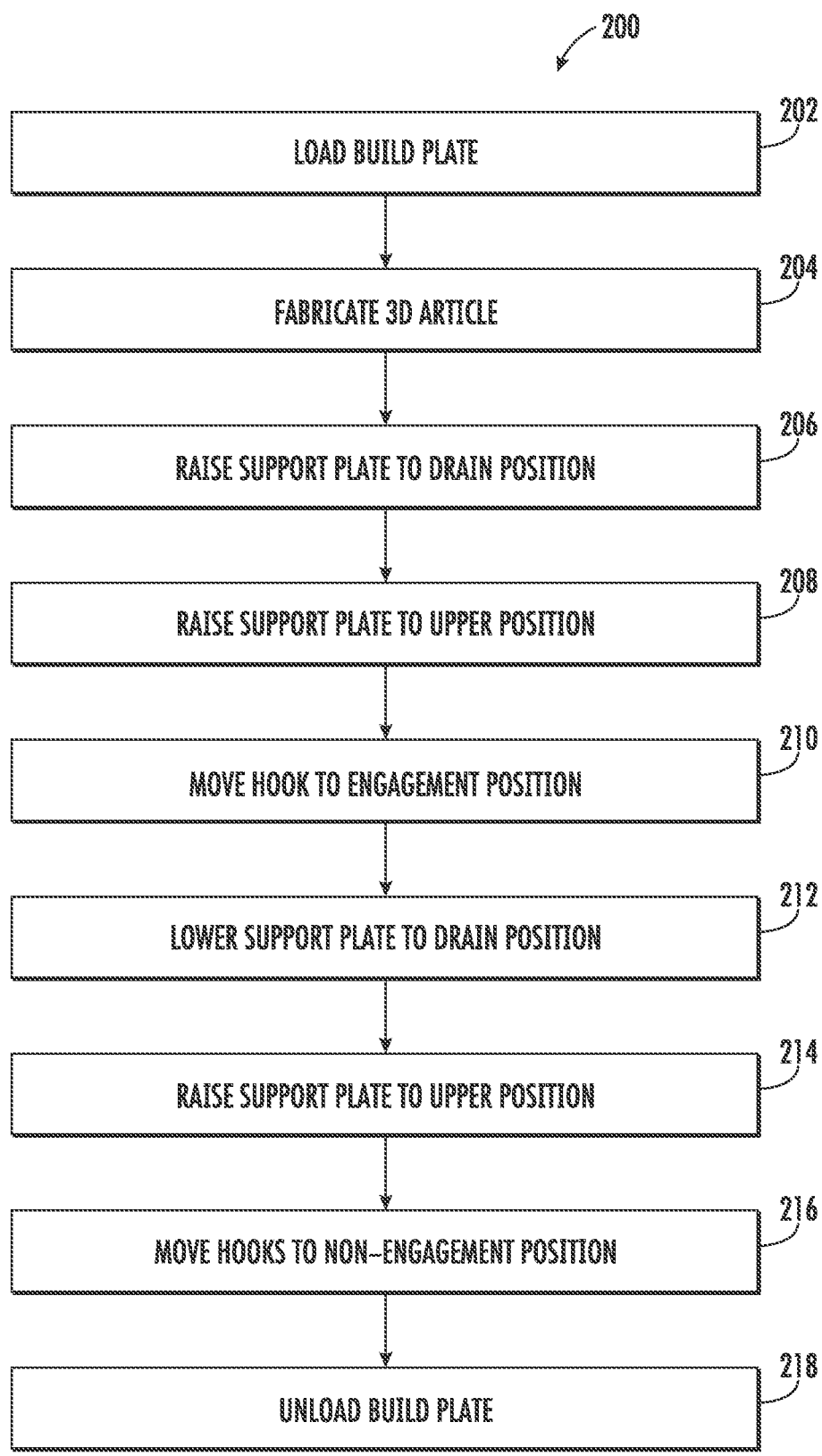
FIG. 2 is an operational flowchart depicting an embodiment of a method for manufacturing a 3D article.

FIG. 2 is an operational flowchart depicting an embodiment of a method 200 of manufacturing a 3D article 4. Method 200 is also illustrated in figures that follow FIG. 2. The controller 20 is configured to perform at least part of the method 200 including steps 204-216 either automatically or, for some steps, in response to a user input such as pushing a button or inputting a command into a user interface. Some steps such as step 202 can be performed either manually or by controller 20.

According to 202, a build plate 8 is loaded onto plate support 10. According to 204, various components of system 2 are operated by controller 20 to fabricate the 3D article 4 (which may include a scaffold and/or base layers). An example of step 204 has been described supra. The fabricated article can be heavy, weighing over 100 pounds, over 150 pounds, or over 200 pounds.

Figure 3:
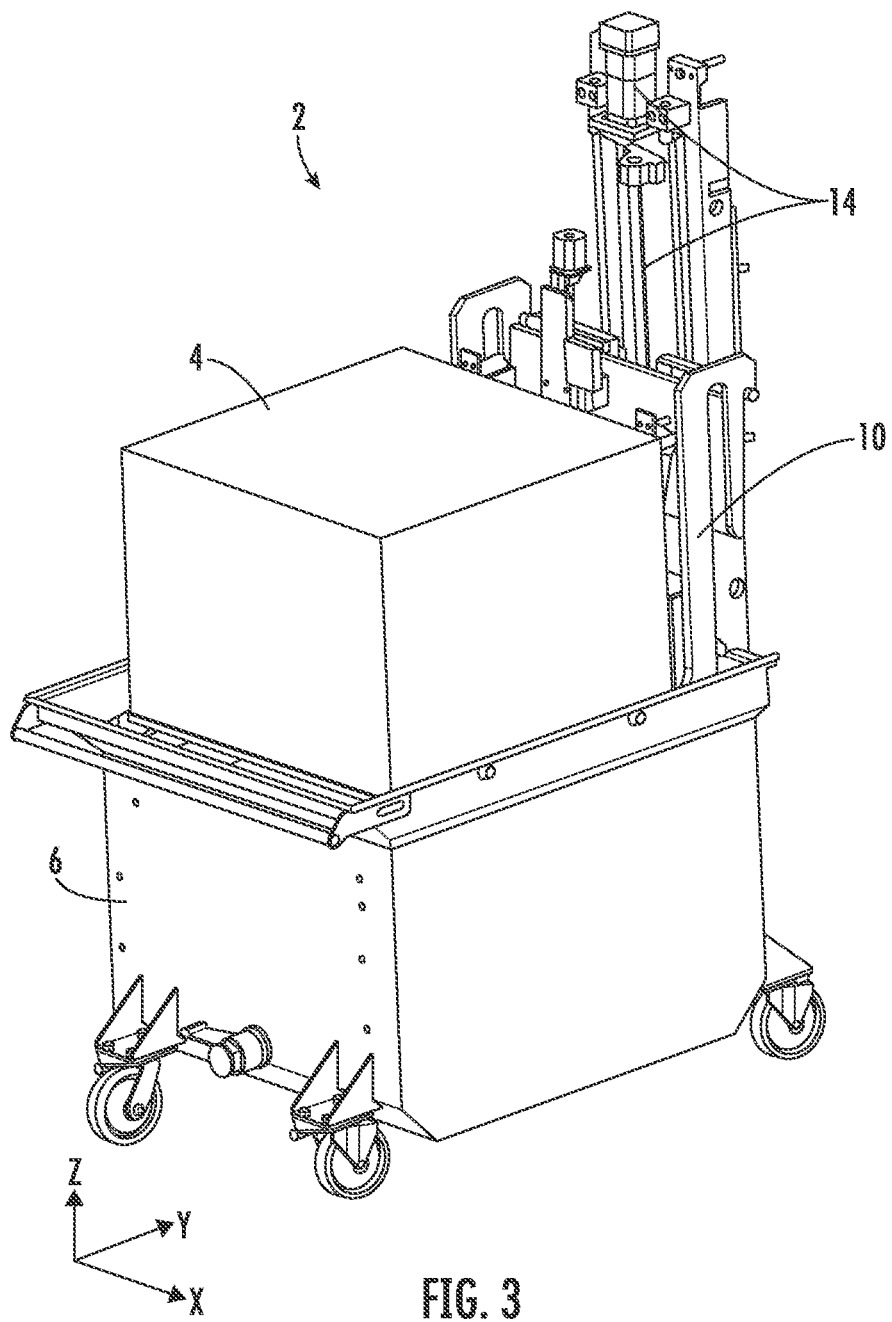
FIG. 3 is an isometric perspective view of a portion of a 3D printing system. A plate support is vertically positioned in a "drain position". Drain position refers to a vertical position at which the 3D article is above a resin level in the resin vessel.

According to 206, the elevator subsystem 14 is operated to raise the plate support 10 to a drain position (or initial drain position). This is illustrated in FIG. 3, which is an isometric drawing of an embodiment of a portion of 3D printing system 2. The illustrated drain position has the build plate 8 above the upper surface 24 (FIG. 1) of the photocurable resin 22 and allows some residual photocurable resin 22 to drain into resin vessel 6. In the illustrated embodiment, the elevator subsystem includes a stationary motor coupled to a lead screw. As the lead screw is rotated, the vertical position of the plate support 10 is varied according to a rotational direction and magnitude of the lead screw.

Figure 4:
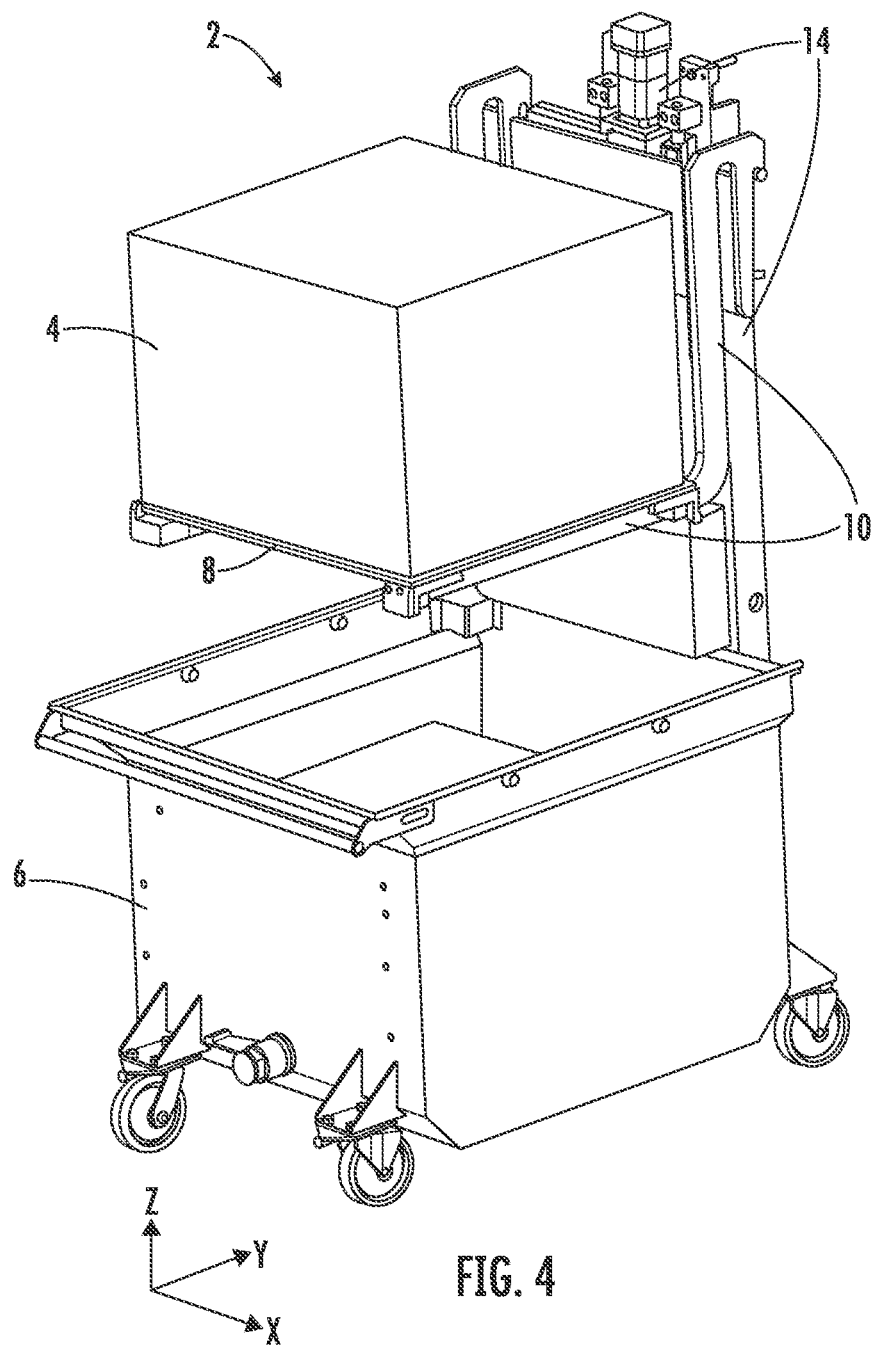
FIG. 4 is an isometric perspective view of a portion of a 3D printing system. A plate support is vertically positioned in an "upper position". At the upper position, the plate support is raised to a level that is a "vertical separation distance" H above the drain position of FIG. 3.
Figure 5:
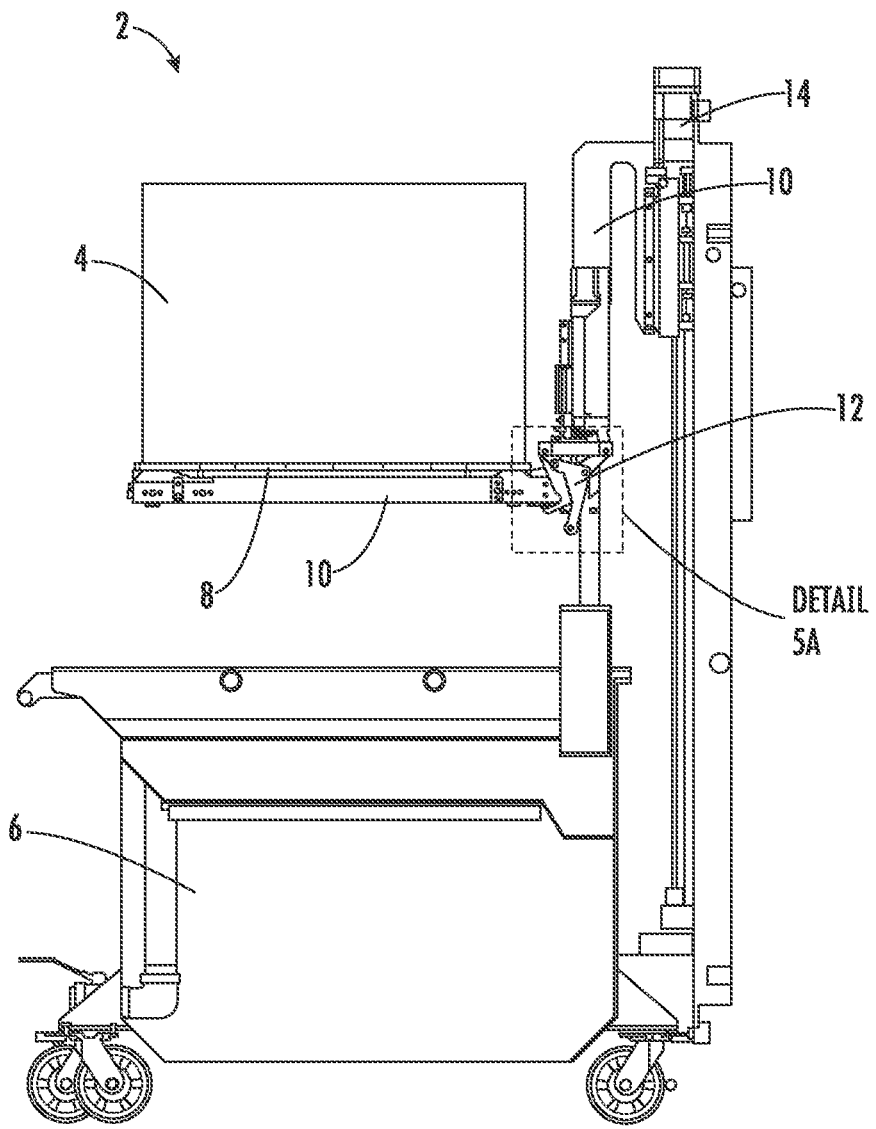
FIG. 5 is a side view of a portion of a 3D printing system. A plate support is vertically positioned in the upper position. A hook subsystem is shown in a non-engagement configuration. In a non-engagement configuration, the hook subsystem will not interfere with the build plate as it is raised and lowered.
Figure 5A:
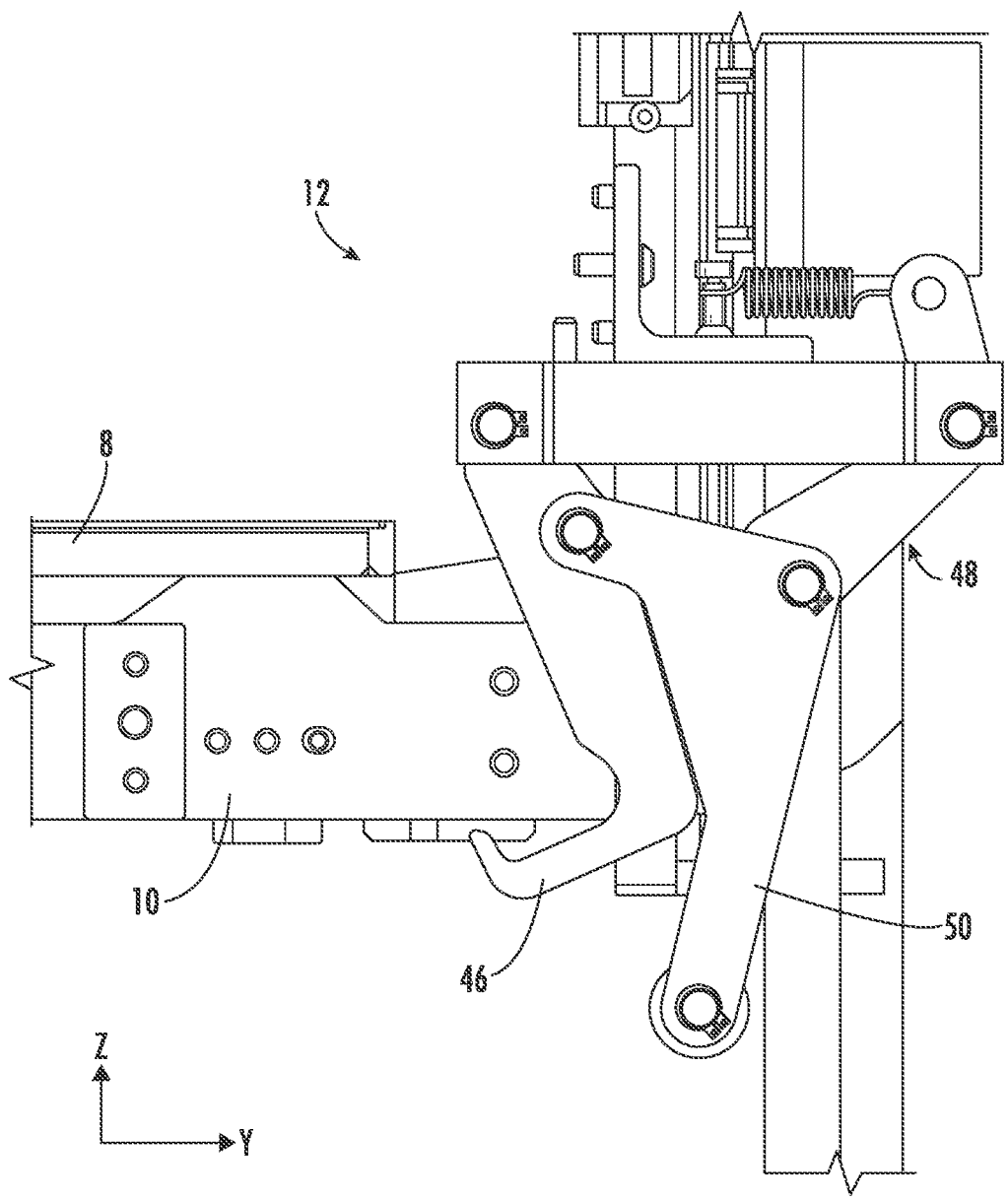
FIG. 5A is detail 5A taken from FIG. 5. A hook subsystem is shown in a non-engagement (5A) configuration.

According to 208, the elevator subsystem 14 is operated to raise the plate support 10 to an upper position which is a vertical distance H above the drain position. This is illustrated in FIGS. 4 and 5 which are isometric and side views respectively. In this state, the hook subsystem 12 is in a non-engagement (5A) configuration. FIG. 5A is detail 5 taken from FIG. 5 illustrating the hook subsystem 12 including hook 46. The hook subsystem 12 includes a four bar linkage 48 which includes hook rotating link 50. At this upper position, the plate support 10 is generally at a same vertical position as the four bar linkage 48.

Figure 6:
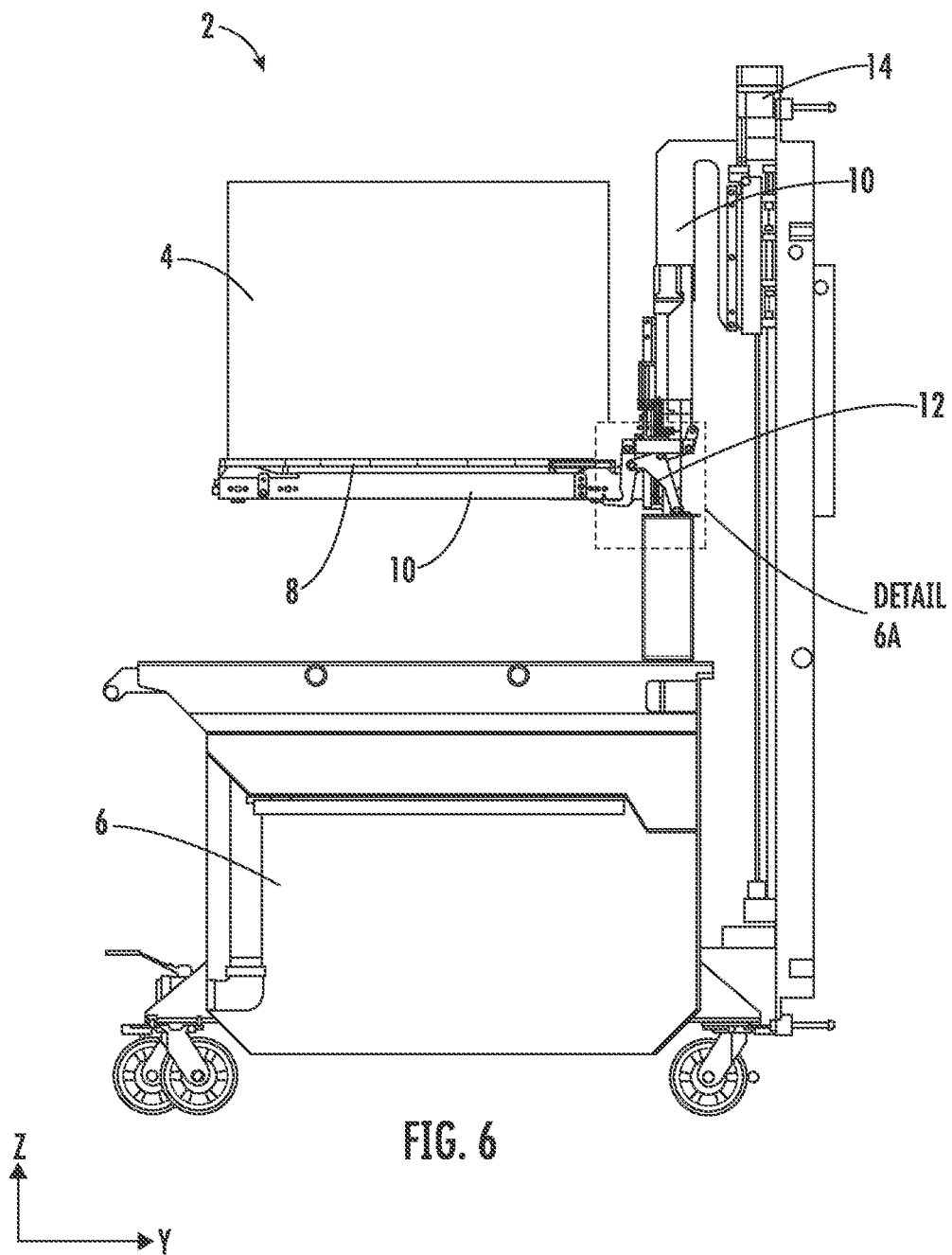
FIG. 6 is a side view of a portion of a 3D printing system. A plate support is vertically positioned in an upper position. A hook subsystem is shown in an engagement configuration. In an engagement position, the hook subsystem will support a proximal end of the build plate as the plate support is lowered.
Figure 6A:
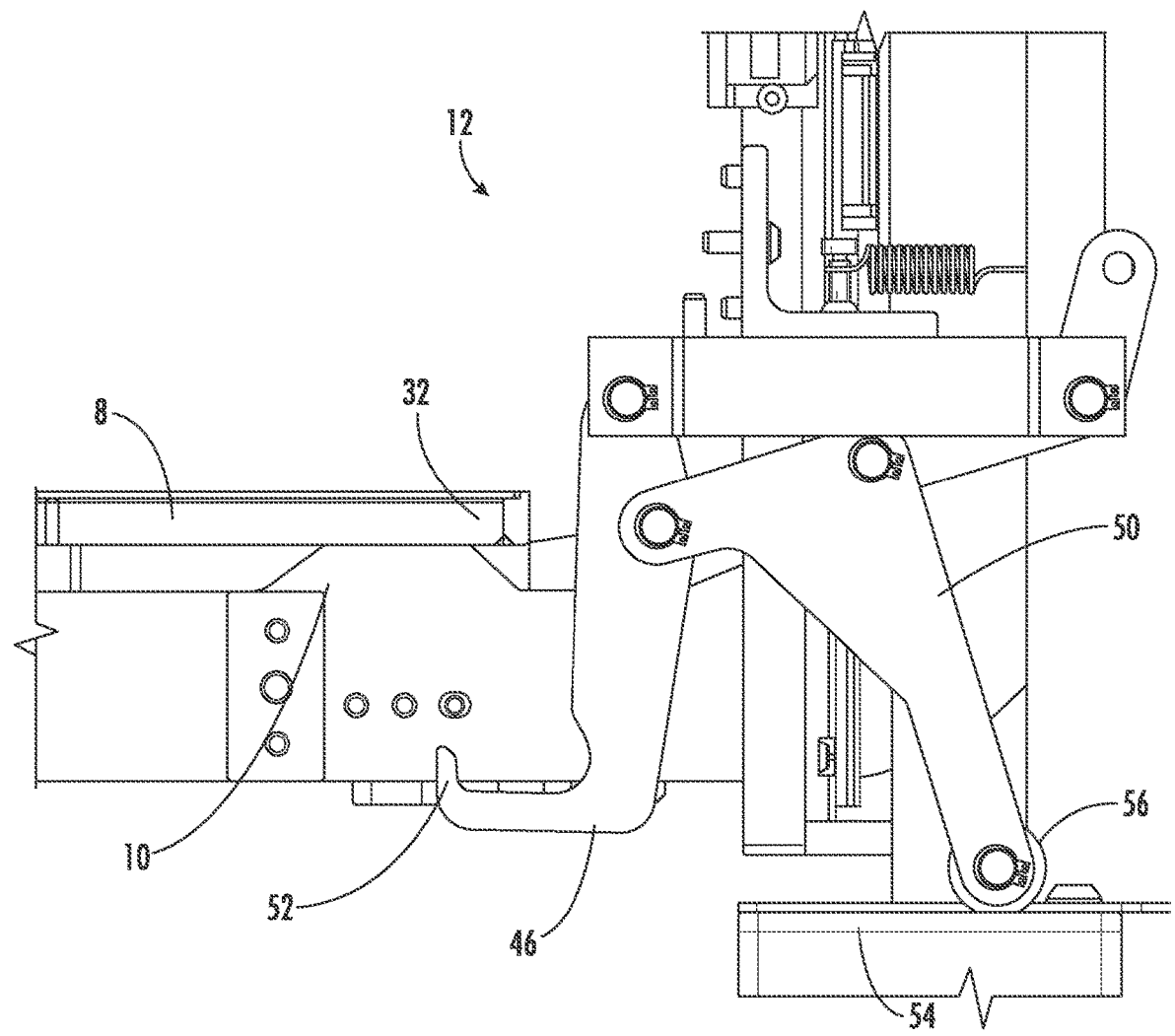
FIG. 6A is detail 6A taken from FIG. 6. A hook subsystem is shown in an engagement (6A) configuration.

According to 210, the hook subsystem 12 is operated to rotate the hook 46 to an engagement (6A) configuration or position. This is illustrated in FIGS. 6 and 6A. In the illustrated embodiment, the hook 46 is in an engagement position. In the engagement position, an upstanding tip 52 of hook 46 is positioned below the proximal end 32 of the build plate 8. FIG. 6A is a side detail view of one hook, but it is to be understood there are two such hooks 46 that are spaced part along the axis X. Thus two hooks 46 are configured to engage the proximal end 32 of the build plate 8.

To transition from the non-engagement (5A) position of FIG. 5A to the engagement (6A) position of FIG. 6A an actuator 54 is vertically pressed against a roller 56 on the hook rotating link 50. This has the effect of rotating the hook rotating link 50 in a counter-clockwise direction which in turn rotates the hook 46 in a clockwise direction (in the illustration). The actuator 54 can be driven upward and downward by a lead screw, a translating belt drive, or a solenoid valve, to name a few examples any of which can be part of the hook subsystem 12. Controller 20 can link to hook subsystem 12 to configure hook 46 in either the engagement (6A) or non-engagement (5A) position or configuration.

While the illustrated embodiment of hook subsystem 12 illustrates a four bar linkage type design, other approaches are possible. Motion of the hook 46 can be driven by other devices such as a motorized gear train, linear sliders and actuators, other rotating actuators, motorized lead screws, and other mechanisms.

Figure 7:
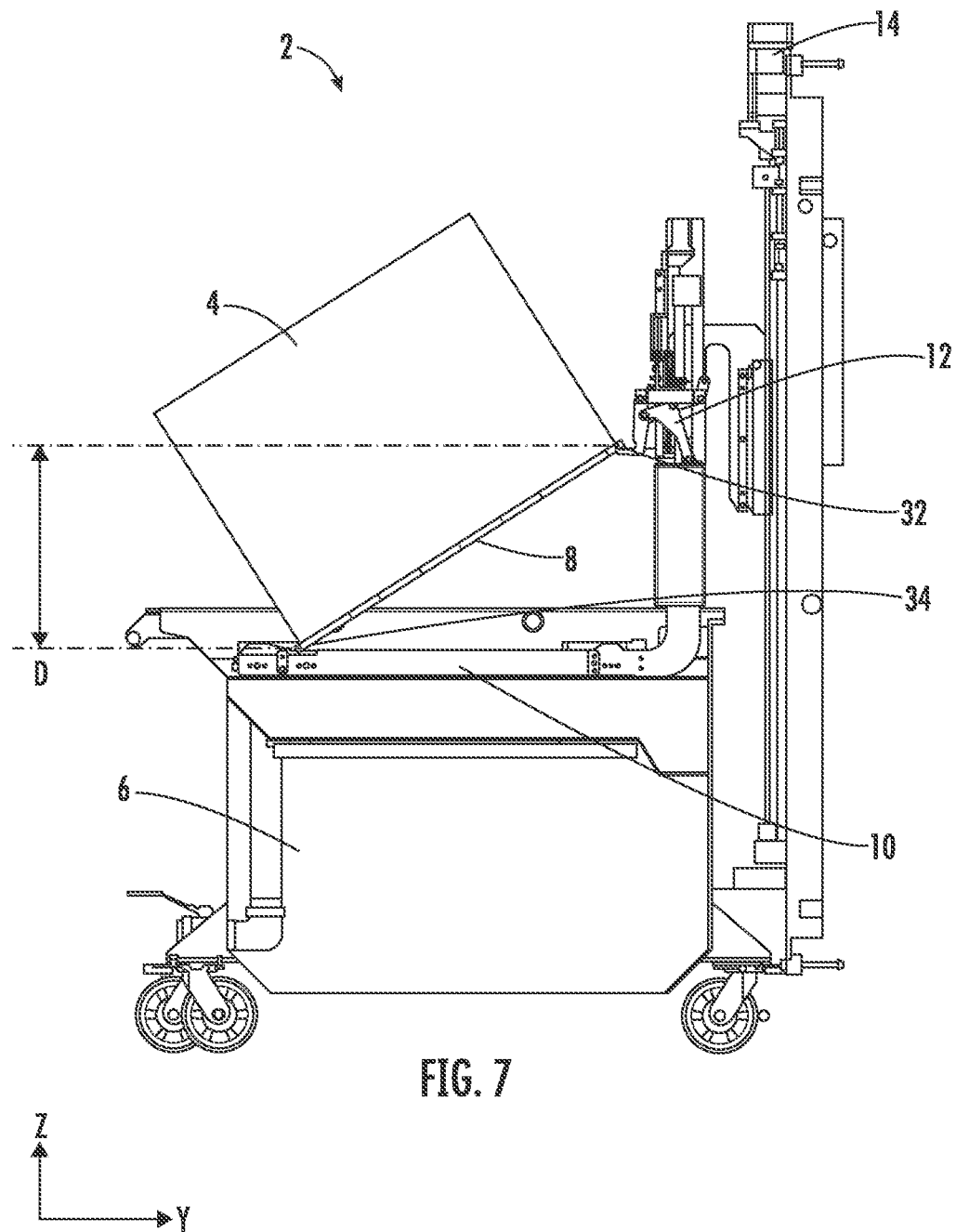
FIG. 7 is a side view of a portion of a 3D printing system. A plate support has been vertically lowered to a drain position while the hook subsystem is in the engaged configuration. As a result, a build plate exhibits an angular tilt because the proximal end of the build plate is being supported by the hook position while the distal end of the build plate is supported by the plate support.

According to 212, elevator subsystem 14 is operated to lower the plate support 10 back to the drain position. This imparts a vertical separation distance D between the proximal end 32 and the distal end 34 of the build plate 8. This is illustrated in FIG. 7. The result is an angular tilt of the build plate 8 to facilitate draining of residual photocurable resin 22 into the resin vessel 6. The distance D correlates with H but is generally slightly less. The actual magnitude of D may depend on aspects or factors like a lateral dimension of the build plate 8 and weight of the 3D article 4 and possibly other factors.

According to 214, elevator subsystem 14 is operated to raise the plate support 10 back to the upper position. In this position, the build plate 8 is horizontal again as illustrated in FIG. 6. According to 216, the hook subsystem 12 is operated to rotate hook 46 to a non-engagement position as illustrated in FIGS. 5 and 5A. This can be accomplished by lowering the actuator 54. Finally the build plate 8 and 3D article 4 can be unloaded according to 218.

The illustrative embodiment of FIGS. 2-7 depict the build plate 8 being tilted when the hook 46 is engaging the proximal end 32 and the plate support 10 is lowered. Other variations are possible. For example, a modified elevator mechanism 14 could raise the hook 46 up the distance H while the plate support 10 remains stationary to accomplish the same result. Thus, there are design-based variations as to how the elevator subsystem 14 imparts and varies a vertical separation between the hook subsystem 12 and the plate support 10.

The flowchart and illustrations of FIGS. 2-7 have provided an introduction to the structure and operation of a mechanism for raising, lowering, and tilting the build plate 8 with the attached 3D article 4. What follows are some additional useful details of the mechanism and operation for particular embodiments.

Figure 8:
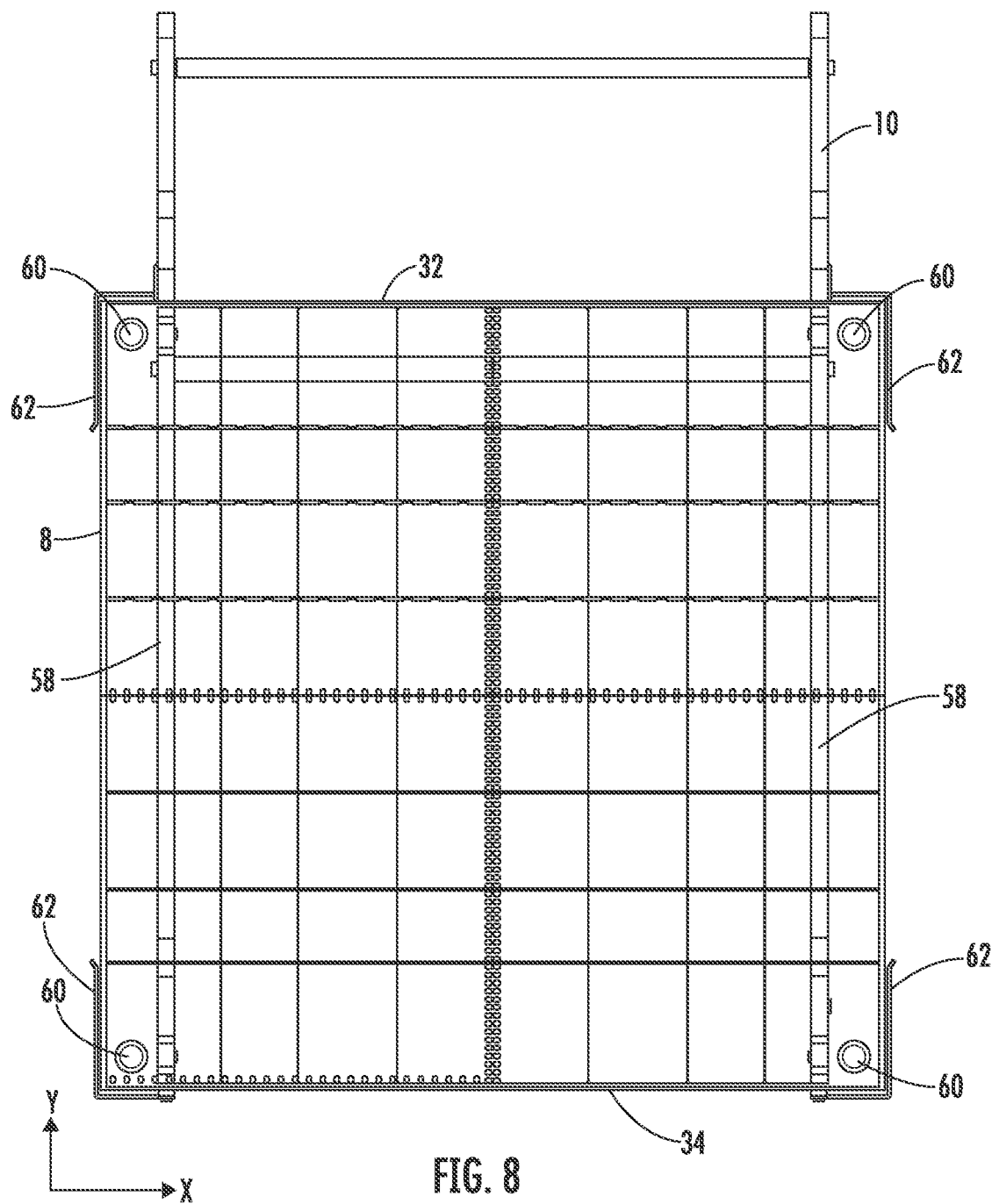
FIG. 8 is an overlay view depicting a build plate over a plate support. The build plate material shown is shown as transparent to illustrate features of the plate support under the build plate.

FIG. 8 illustrates an overlay of the build plate 8 (transparent so as to see features below) over the plate support 10. The plate support 10 includes a pair of support beams 58 that are spaced apart in X and support a plurality of upward extending datums 60 that engage the lower side 30 of the build plate 8. The support beams 58 also support lateral constraints 62 that provide a lateral constraint for the build plate 8 along the X and Y axes. The plurality of datums 60 include two datums 60 that support the proximal end 32 of the build plate 8 and two datums 60 that support the distal end 34 of build plate 8.

Figure 9:
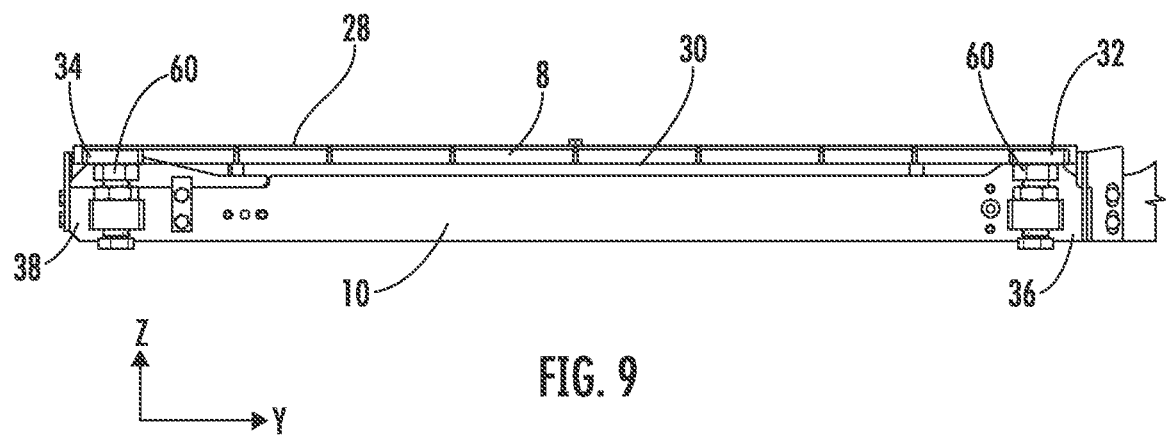
FIG. 9 is a side view depicting a build plate over a plate support.

FIG. 9 is a side view depicting the build plate 8 supported by plate support 10. The proximal end 36 of plate support 10 includes upstanding datums 60 supporting the proximal end or edge 32 of build plate 8. The distal end 38 of plate support 10 includes upstanding datums 60 supporting the distal end or edge 34 of build plate 8. As shown, datums 60 engage lower side 30 of build plate 8.

Figure 10:
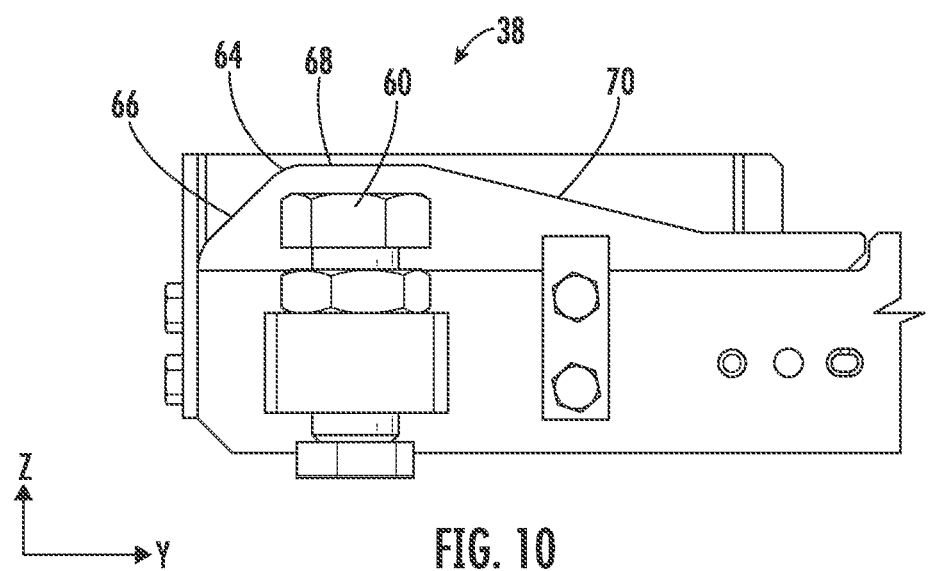
FIG. 10 is a side view depicting a distal end of a plate support. This allows for a detail view of a datum and cam surface.

FIG. 10 is a side view of the distal end 38 of the plate support 10. In addition to the upstanding datums 60, the distal end 38 includes a cam surface 64. The cam surface 64 has three sections including a first ramp 66, a flat surface 68, and a second ramp 70. In the illustrated embodiment, the first ramp 66 slopes upward along a +Y direction from the distal 38 end toward the proximal end 36 with a slope defining a ramp angle that is about 45 degrees relative to the horizontal Y-axis. The flat surface 68 extends above the datum 60. The second ramp 70 slopes downwardly along the +Y direction with a slope defining a ramp angle that is less than 30 degrees relative to the Y-axis. The slopes of ramps 66 and 70 are not critical and can vary as desired. A lower magnitude for the slope reduces a force required to slide the distal end 34 of the build plate 8 over the cam surface 64 as the distal end 34 is being raised.

Figure 11:
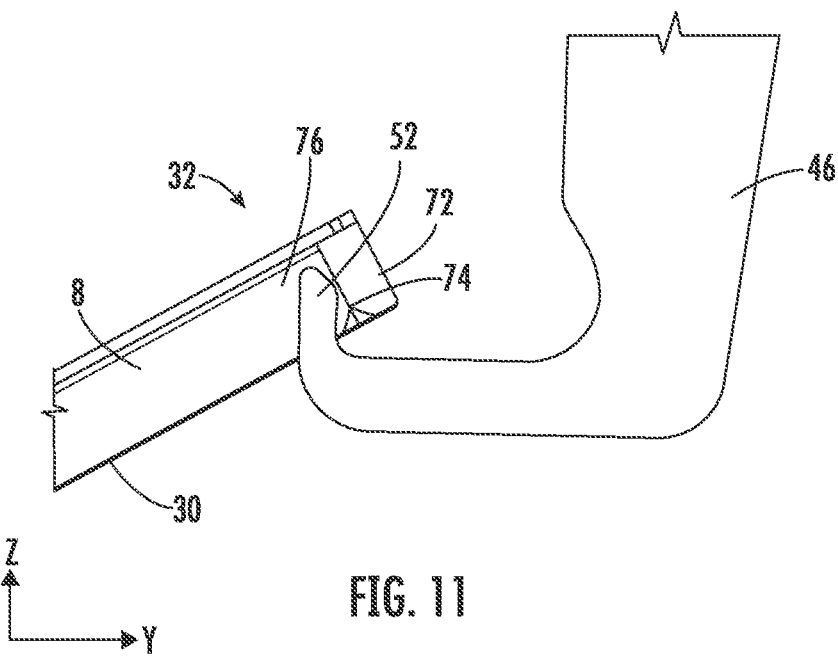
FIG. 11 is a side view depicting a detailed side view of a hook engaging a proximal end of a build plate.

FIG. 11 is a detailed side view depicting engagement of hook 46 with the proximal end 32 of the build plate 8 during step 212 of method 200. The proximal end 32 includes a downward extending lip 72 with an inside edge 74 bordering a recess 76 in the lower side 30 of build plate 8. The upstanding tip 52 of hook 46 enters recess 76 and then engages inside edge 74 of lip 72 to maintain a height of the proximal end 32 as the distal end 34 of build plate 8 is lowered during step 212.

Figure 12:
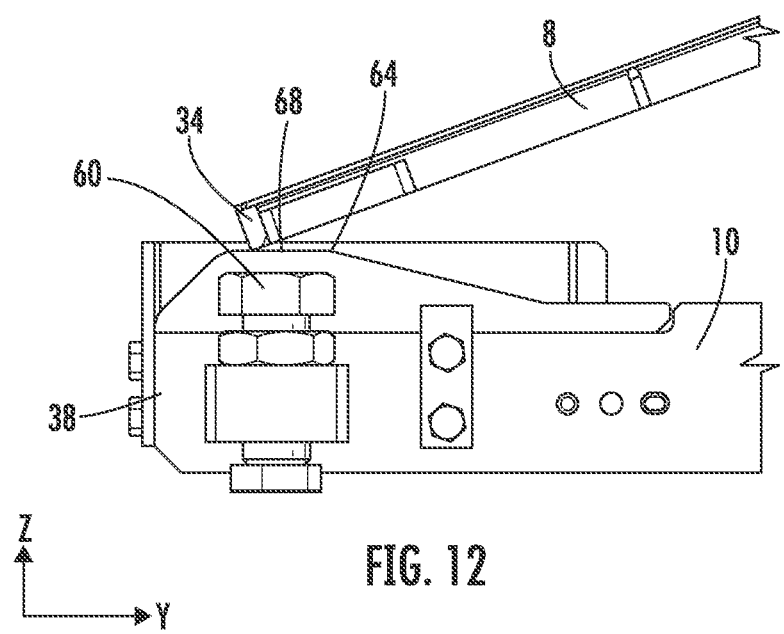
FIG. 12 is a side view depicting engagement between a distal end of a build plate and a cam surface of a plate support. As a relative vertical distance between the plate support and hook subsystem is varied, the distal end of the build plate follows the cam surface.
Figure 13:
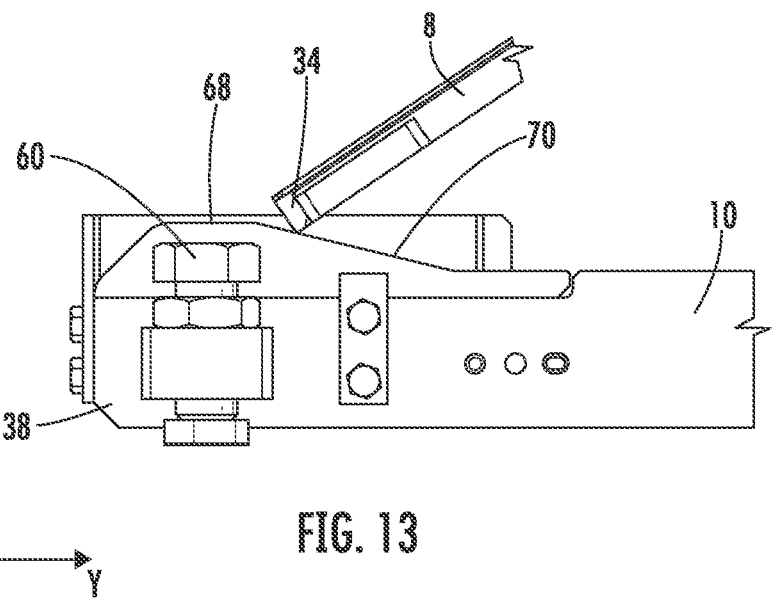
FIG. 13 is a side view depicting engagement between a distal end of a build plate and a cam surface of a plate support. As a relative vertical distance between the plate support and hook subsystem is varied, the distal end of the build plate follows the cam surface.

FIGS. 12 and 13 are side views that depict the engagement of the distal end 34 of build plate 8 with cam surface 64 during step 212 or step 214 of method 200. During steps 212 and 214, the distal end 34 follows (slides along under a gravitational force) the cam surface 64. As step 212 begins, the cam surface 64 engages and lifts the distal end 34 off of the datums 60. Then the illustration of FIG. 12 depicts how the flat surface 68 of cam surface 64 maintains a clearance between the distal end 34 and the datums 60. Referring to FIG. 13, a gradual slope of the second ramp 70 facilitates pushing the distal end 34 back toward datums 60 during step 214.

Figure 14:
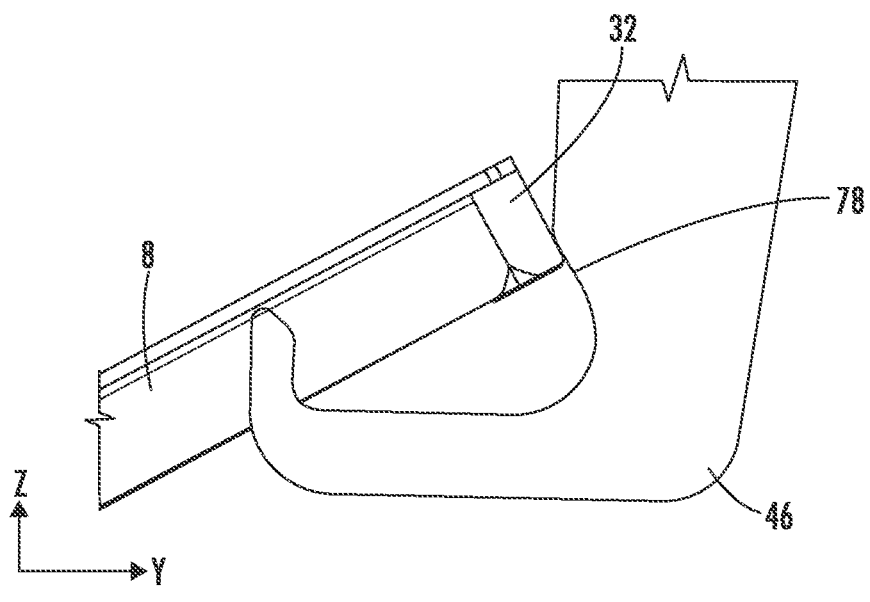
FIG. 14 is a side view depicting a detailed side view of a hook engaging and pushing a proximal end of a build plate.

FIG. 14 is a side view depicting engagement between the hook 46 and the proximal end 32 of the build plate 8 during step 214. Hook 46 has an oblique surface 78 configured to engage and push the proximal end 32 of the build plate 8 as the distal end 34 is being pushed along cam surface 64 up and over the datums 60.

The specific embodiments and applications thereof described above are for illustrative purposes only and do not preclude modifications and variations encompassed by the scope of the following claims.

What is claimed:

1. A system for manufacturing a three-dimensional (3D) article comprising:
   a resin vessel configured for containing a photocurable resin;
   a build plate having an upper surface extending along a Y-axis from a proximal end to a distal end;
   a plate support supporting the build plate and extending along the Y-axis from a proximal end corresponding to the proximal end of the build plate to a distal end corresponding to the distal end of the build plate;
   a hook subsystem having a hook;
   an elevator subsystem;
   an imaging subsystem;
   a controller configured to:
   (a) operate the elevator subsystem and the imaging subsystem to progressively lower the upper surface of the build plate into the resin vessel while forming the 3D article above the upper surface of the build plate;
   (b) operate the elevator subsystem to raise the 3D article to a vertical position above a level of photocurable resin in the resin vessel;
   (c) operate the hook subsystem to move the hook from a non-engagement configuration to an engagement configuration, in the engagement configuration the hook is positioned for engagement with the proximal end of the build plate; and
   (d) operate the elevator subsystem to impart a vertical separation distance between the proximal end of the build plate supported by the hook subsystem and the distal end of the build plate supported by the plate support, the vertical separation distance provides an angular tilt of the build plate and the 3D article to facilitate draining of residual photocurable resin from the 3D article into the resin vessel,
   wherein the build plate has a lower side with a downwardly extending lip adjacent to a recess, operating the hook subsystem includes positioning a tip of the hook below the recess, the hook is configured to engage the downwardly extending lip to maintain a vertical position of the proximal end of the build plate relative to the distal end of the build plate during step (d).

2. The system of claim 1 wherein the 3D article weighs more than 100 pounds.

3. The system of claim 1 wherein operating the elevator subsystem includes lowering the plate support to provide the vertical separation distance.

4. The system of claim 1 wherein the hook includes two hooks that are spatially separated to engage the proximal end of the build plate at spaced part locations.

5. A system for manufacturing a three-dimensional (3D) article comprising:
   a resin vessel configured for containing a photocurable resin;
   a build plate having an upper surface extending along a Y-axis from a proximal end to a distal end;
   a plate support supporting the build plate and extending along the Y-axis from a proximal end corresponding to the proximal end of the build plate to a distal end corresponding to the distal end of the build plate;
   a hook subsystem having a hook;
   an elevator subsystem;
   an imaging subsystem;
   a controller configured to:
   (a) operate the elevator subsystem and the imaging subsystem to progressively lower the upper surface of the build plate into the resin vessel while forming the 3D article above the upper surface of the build plate;
   (b) operate the elevator subsystem to raise the 3D article to a vertical position above a level of photocurable resin in the resin vessel;
   (c) operate the hook subsystem to move the hook from a non-engagement configuration to an engagement configuration, in the engagement configuration the hook is positioned for engagement with the proximal end of the build plate; and
   (d) operate the elevator subsystem to impart a vertical separation distance between the proximal end of the build plate supported by the hook subsystem and the distal end of the build plate supported by the plate support, the vertical separation distance provides an angular tilt of the build plate and the 3D article to facilitate draining of residual photocurable resin from the 3D article into the resin vessel,
   wherein the hook subsystem includes a four bar linkage and an actuator, the four bar linkage includes a hook rotating link coupled to the hook, the actuator is configured to press upon the hook rotating link which in turn rotates the hook from the non-engagement configuration to the engagement configuration.

6. A system for manufacturing a three-dimensional (3D) article comprising:
   a resin vessel configured for containing a photocurable resin;
   a build plate having an upper surface extending along a Y-axis from a proximal end to a distal end;
   a plate support supporting the build plate and extending along the Y-axis from a proximal end corresponding to the proximal end of the build plate to a distal end corresponding to the distal end of the build plate;
   a hook subsystem having a hook;
   an elevator subsystem;
   an imaging subsystem;
   a controller configured to:
   (a) operate the elevator subsystem and the imaging subsystem to progressively lower the upper surface of the build plate into the resin vessel while forming the 3D article above the upper surface of the build plate;
   (b) operate the elevator subsystem to raise the 3D article to a vertical position above a level of photocurable resin in the resin vessel;
   (c) operate the hook subsystem to move the hook from a non-engagement configuration to an engagement configuration, in the engagement configuration the hook is positioned for engagement with the proximal end of the build plate; and (d) operate the elevator subsystem to impart a vertical separation distance between the proximal end of the build plate supported by the hook subsystem and the distal end of the build plate supported by the plate support, the vertical separation distance provides an angular tilt of the build plate and the 3D article to facilitate draining of residual photocurable resin from the 3D article into the resin vessel, wherein the controller is further configured to operate the elevator subsystem to reduce the vertical separation distance until the build plate upper surface is generally horizontal, the distal end of the plate support has a cam surface, the distal end of the build plate follows the cam surface as the vertical separation distance is varied by the elevator subsystem.

7. The system of claim 6 wherein during reducing the vertical separation distance, the hook is configured to engage an edge of the build plate to push the distal end of the build plate along the plate support.

8. The system of claim 6 wherein the cam surface includes a ramp surface that slopes downwardly from the distal end to the proximal end, the ramp surface facilitates raising the distal end of the build plate over a datum.

9. A system for manufacturing a three-dimensional (3D) article comprising:
   a resin vessel configured for containing a photocurable resin;
   a build plate having an upper surface extending along a Y-axis from a proximal end to a distal end;
   a plate support supporting the build plate and extending along the Y-axis from a proximal end corresponding to the proximal end of the build plate to a distal end corresponding to the distal end of the build plate;
   a hook subsystem having a hook;
   an elevator subsystem;
   an imaging subsystem;
   a controller configured to:
   (a) operate the elevator subsystem and the imaging subsystem to progressively lower the upper surface of the build plate into the resin vessel while forming the 3D article above the upper surface of the build plate;
   (b) operate the elevator subsystem to raise the 3D article to a vertical position above a level of photocurable resin in the resin vessel;
   (c) operate the hook subsystem to move the hook from a non-engagement configuration to an engagement configuration, in the engagement configuration the hook is positioned for engagement with the proximal end of the build plate; and
   (d) operate the elevator subsystem to impart a vertical separation distance between the proximal end of the build plate supported by the hook subsystem and the distal end of the build plate supported by the plate support, the vertical separation distance provides an angular tilt of the build plate and the 3D article to facilitate draining of residual photocurable resin from the 3D article into the resin vessel,
   wherein the plate support has a plurality of upward extending datums configured to engage a lower side of the build plate when the build plate is generally horizontal.

10. The system of claim 9 wherein the plurality of upward extending datums includes two proximal datums spaced apart with respect to an X-axis that is orthogonal to the Y-axis and positioned to engage the lower side of the proximal end of the build plate.

11. The system of claim 10 wherein the plate support includes a pair of cam surfaces that are spaced apart with respect to the X-axis, the distal end of the build plate follows the cam surfaces along the Y-axis as the vertical separation distance is varied, the cam surface lifts the proximal end of the build plate off of the proximal datums as the vertical separation distance is increased.

12. The system of claim 11 wherein the cam surface includes:
   a flat surface configured to maintain a spacing of the distal end of build plate above the datums as the distal end of the build plate follows the flat surface;
   a first ramp that slopes upwardly from the distal end of the plate support to the flat surface; and
   a second ramp that slopes downwardly away from the flat surface toward the proximal end of the plate support.

13. A method for manufacturing a 3D article with a 3D printing system, the 3D printing system including:
   a resin vessel for containing a photocurable resin;
   a build plate having an upper surface and extending along a Y-axis from a proximal end to a distal end;
   a plate support extending along the Y-axis from a proximal end corresponding to the proximal end of the build plate to a distal end corresponding to the distal end of the build plate;
   a hook subsystem having a hook;
   an elevator subsystem; and
   an imaging subsystem;
   the method comprising:
   (a) operating the elevator subsystem and the imaging subsystem to progressively lower the upper surface of the build plate into the resin vessel while forming the 3D article above the upper surface of the build plate;
   (b) operating the elevator subsystem to raise the 3D article to a vertical position above a level of photocurable resin in the resin vessel;
   (c) operating the hook subsystem to move the hook from a non-engagement configuration to an engagement configuration, in the engagement configuration the hook is positioned for engagement with the proximal end of the build plate; and
   (d) operating the elevator subsystem to impart a vertical separation distance between the proximal end of the build plate supported by the hook subsystem and the distal end of the build plate supported by the plate support, the vertical separation distance provides an angular tilt of the build plate and the 3D article to facilitate draining of residual photocurable resin from the 3D article into the resin vessel,
   wherein the hook has an upstanding tip, the proximal end of the build plate has a downward extending lip, during step (d) the upstanding tip engages the downward extending lip to maintain a height of the proximal end of the build plate.

14. The method of claim 13 wherein, during step (a), the 3D printing system forms a 3D article weighing more than 100 pounds.

15. The method of claim 13 wherein during step (d) the elevator system lowers the plate support to define the vertical separation distance.

16. A method for manufacturing a 3D article with a 3D printing system, the 3D printing system including:
   a resin vessel for containing a photocurable resin;
   a build plate having an upper surface and extending along a Y-axis from a proximal end to a distal end;

a plate support extending along the Y-axis from a proximal end corresponding to the proximal end of the build plate to a distal end corresponding to the distal end of the build plate;
a hook subsystem having a hook;
an elevator subsystem; and
an imaging subsystem;
the method comprising:
(a) operating the elevator subsystem and the imaging subsystem to progressively lower the upper surface of the build plate into the resin vessel while forming the 3D article above the upper surface of the build plate;
(b) operating the elevator subsystem to raise the 3D article to a vertical position above a level of photocurable resin in the resin vessel;
(c) operating the hook subsystem to move the hook from a non-engagement configuration to an engagement configuration, in the engagement configuration the hook is positioned for engagement with the proximal end of the build plate; and
(d) operating the elevator subsystem to impart a vertical separation distance between the proximal end of the build plate supported by the hook subsystem and the distal end of the build plate supported by the plate support, the vertical separation distance provides an angular tilt of the build plate and the 3D article to facilitate draining of residual photocurable resin from the 3D article into the resin vessel,
wherein the hook has an oblique surface, after step (d) the oblique surface presses on the proximal end of the build plate as the vertical separation distance is decreased.

17. A method for manufacturing a 3D article with a 3D printing system, the 3D printing system including:
a resin vessel for containing a photocurable resin;
a build plate having an upper surface and extending along a Y-axis from a proximal end to a distal end;
a plate support extending along the Y-axis from a proximal end corresponding to the proximal end of the build plate to a distal end corresponding to the distal end of the build plate;
a hook subsystem having a hook;
an elevator subsystem; and
an imaging subsystem;
the method comprising:
(a) operating the elevator subsystem and the imaging subsystem to progressively lower the upper surface of the build plate into the resin vessel while forming the 3D article above the upper surface of the build plate;
(b) operating the elevator subsystem to raise the 3D article to a vertical position above a level of photocurable resin in the resin vessel;
(c) operating the hook subsystem to move the hook from a non-engagement configuration to an engagement configuration, in the engagement configuration the hook is positioned for engagement with the proximal end of the build plate; and
(d) operating the elevator subsystem to impart a vertical separation distance between the proximal end of the build plate supported by the hook subsystem and the distal end of the build plate supported by the plate support, the vertical separation distance provides an angular tilt of the build plate and the 3D article to facilitate draining of residual photocurable resin from the 3D article into the resin vessel,
wherein the plate support has a pair of cam surfaces and a pair of datums at the distal end of the plate support, the cam surfaces configured to engage the distal end of the build plate to lift the distal end of the build plate over the pair of datums during step (d).

* * * * *